United States Patent [19]

Sund

[11] Patent Number: 4,841,718

[45] Date of Patent: Jun. 27, 1989

[54] CONVEYING APPARATUS FOR CROP PICKUP

[76] Inventor: Lloyd P. Sund, P.O. Box 79, 200 Main St., Newburg, N. Dak. 58762

[21] Appl. No.: 220,257

[22] Filed: Jul. 18, 1988

[51] Int. Cl.[4] .................. A01D 43/02; A01D 57/03; A01D 89/00

[52] U.S. Cl. .................................. 56/364; 56/400; 56/DIG. 20

[58] Field of Search ............... 56/364, 400, DIG. 20, 56/344, 16.1

[56] References Cited

U.S. PATENT DOCUMENTS

| | | | |
|---|---|---|---|
| 1,896,626 | 2/1933 | Innes | 56/364 |
| 2,795,100 | 6/1957 | Sund | 56/364 |
| 2,906,076 | 9/1959 | McCarty et al. | 56/364 X |
| 3,125,845 | 3/1964 | Lee | 56/364 |
| 3,545,185 | 12/1970 | Whitfield et al. | 56/364 X |
| 4,550,465 | 11/1985 | Chrisley | 56/364 X |
| 4,766,717 | 8/1988 | Thomann | 56/364 X |

FOREIGN PATENT DOCUMENTS

| | | | |
|---|---|---|---|
| 210412 | 8/1956 | Australia | 56/364 |
| 554210 | 3/1958 | Canada | 56/364 |

*Primary Examiner*—Hoang C. Dang
*Attorney, Agent, or Firm*—Moore & Hansen

[57] ABSTRACT

An apparatus for conveying harvested grains to the platform of a combine from a crop pickup which has removed the grains from a field. The assembly includes two rapidly spinning rollers, the front one of which includes several flexible fins which pick grain off of the pickup, and which also acts like a fan, creating an air current which tends to keep grain elevated and helps convey it rearwardly, and the rear one of which further helps convey the grain to the auger of the combine and also helps prevent the grain from being deposited on the ground. When used with a belt-style pickup, the fins of the front, finned roller extend between the flexible fingers of the pickup belt, thereby enabling the crop material to be thoroughly removed from the pickup.

14 Claims, 3 Drawing Sheets

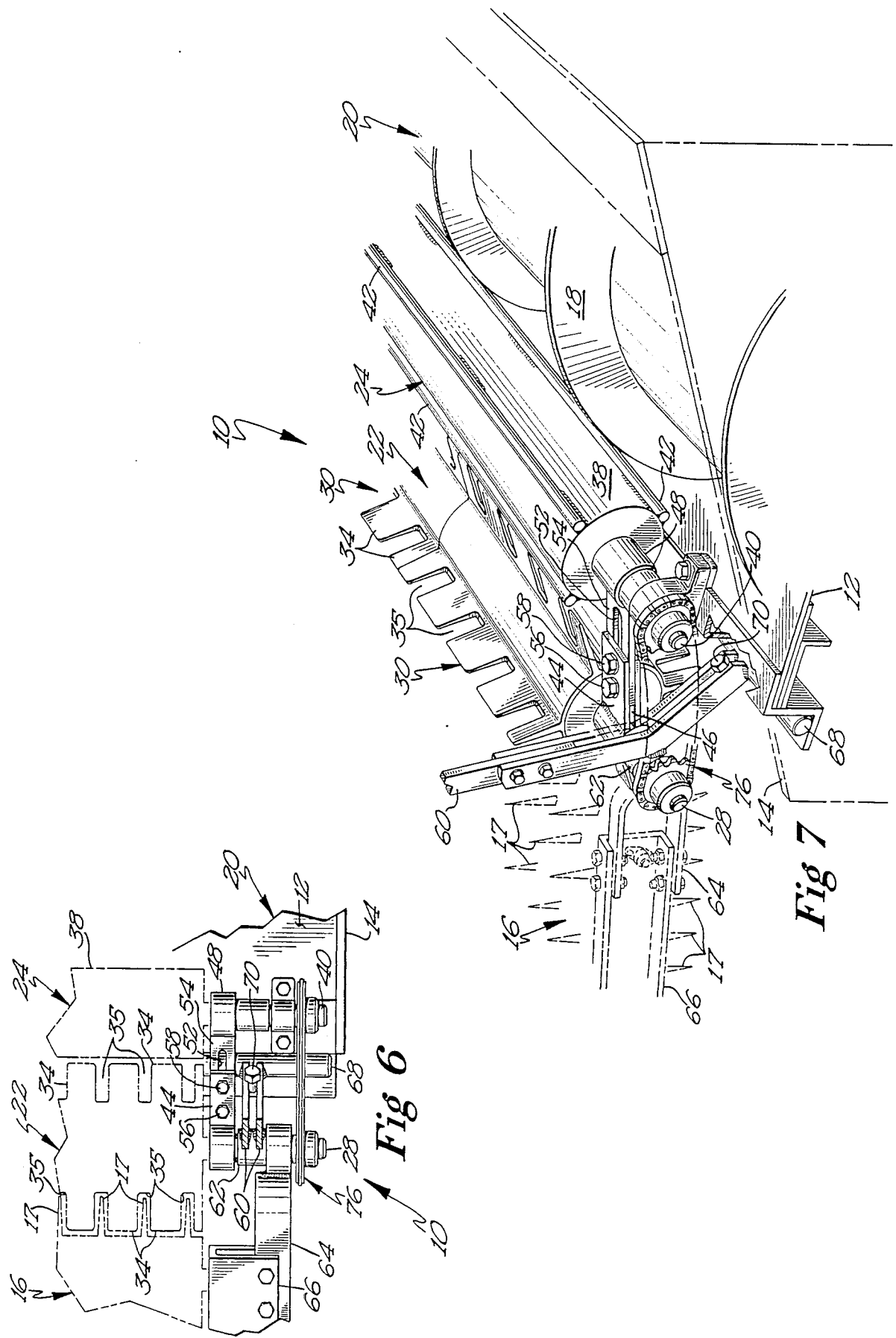

CONVEYING APPARATUS FOR CROP PICKUP

BACKGROUND OF THE INVENTION

This invention relates to grain and crop pickup implements attached to harvesting combines, and particularly to an apparatus found on these implements between the pickup and the platform of the combine which conveys harvested crop materials such as grains and beans from the grain pickup to the grain receiving platform of a combine.

The use of a conveying apparatus as described above, known in some earlier versions as a draper belt drive assembly, intermediate a grain pickup assembly and a combine platform is long known in the harvesting field of the agriculture industry. The purpose of the crop conveying apparatus is to help move grain from the pickup assembly to the combine platform, and to prevent the grain from being inadvertently deposited on the ground behind the pickup assembly without reaching the combine platform. As illustrated in U.S. Pat. No. 2,795,100 issued to Applicant's father on June 11, 1957, draper belt drive assemblies generally include two adjacent, parallel rollers with several belts wrapped about them and rotating cooperatively therewith. These belts have flexible fins or flippers which help carry grain from the pickup to the combine platform. Additionally, on some draper belt drive assemblies, especially those used in harvesting dry beans or similar corps, an additional component known as a bean roller may be used to help convey bean stalks onto a combine platform. A problem has been encountered in the past because of the tendency of draper belts to scrape crop material off of the front end of the platform and onto the ground.

Another problem encountered in previous styles of crop conveying apparatus is the heavy wear resulting to the flexible fins of draper belts from contact with the various types of pickup means employed by grain pickup assemblies, including the stripper bars or sections of raking pickups but especially from the fingers of belt-style pickups. This wear problem is particularly pronounced with belt-style pickups because the grain pickup belt is rotating in a direction opposed to the draper belt, at relatively high speeds, at the point at which the flexible fingers of the belt pickup come into contact with the flexible fins of the draper belt. The pickups operate at speeds of up to 70 rpm. This problem is less pronounced when a raking pickup is employed because the element with which the flexible fins of the draper belts come into contact—the stripper bar or section of the raking pickup—is stationary, and the contact is uniform along the length of the flexible fins, rather than concentrated within a narrow region, as with the fingers of the belt pickup.

A further problem with previous styles of crop conveying apparatus is that should draper belts need replacing due to excessive wear, for example, the entire draper belt assembly would need to be disassembled. This is so because the draper belts are wrapped about two rollers, and both rollers would need to be disassembled in order to access the draper belts to be replaced.

With this background in mind, a crop material conveying apparatus which is more effective, serviceable, and durable has been developed.

SUMMARY OF THE INVENTION

There are three different and readily apparent advantageous differences between the crop conveying apparatus of this invention and those of previous styles. These include the replacement of a draper belt arrangement requiring two rollers with a single roller belt arrangement for mounting the flexible fin or flipper element of the crop conveying apparatus; spaced apart slots located along the length of the flexible fins or flippers of the finned roller; and the replacement of the rear roller with a new style roller which functions in the same capacity and manner as the bean rollers of previous configurations, thus eliminating the need for a bean roller as an attachment when using the crop conveying apparatus.

Using a single roller configuration for mounting the flexible fins of the crop conveying apparatus provides the advantage of enabling the replacement of damaged belt segments without dismantling the crop conveying assembly. This is because now the new finned belts are made of a one or two piece construction so as to allow for clamping the piece or pieces together to form a belt, rather than requiring that belts be slid longitudinally along the roller to their proper position Therefore it is no longer necessary to remove rollers, intermediate hardware or other draper belts which may not need replacement.

The slots between the fins of the front roller, or finned roller, of the improved crop conveying apparatus are spaced apart to allow the pickup fingers of the belt-style pickup to pass therebetween, reducing the wear of the fins found in previous styles caused by contact between the fins and the fingers. Further, the fins passing between the fingers of the belts allow for better "clean out" of crop material that may be lodged between the flexible fingers. Also, the front roller may be positioned closer to the rear roller of the pickup, closing the gap therebetween and thereby lessening the droppage of cut grain through that gap. This improves the efficiency of the belt pickup and results in greater efficiency of overall combine performance as well, since more of the crop material is likely to reach the combine platform.

Removing the need for an additional bean roller in certain applications reduces the number of moving parts that need to be maintained, thereby reducing breakdowns and combine down time. This results in overall savings for the farmer.

When used with a raking pickup, the improved crop conveying apparatus functions in much the same way as the previous styles of draper belt assemblies, but the advantages of improved and easier maintenance are the same as for the belt-style pickup.

When used with either type of pickup, the fins act like a fan, creating an air current which tends to keep grain elevated and helps convey it rearwardly. Rods mounted horizontally on the rear roller further help carry the grain back to the auger, and help maintain the pile of grain in a relatively flat configuration as it is passed from the pickup to the auger for easier processing by the auger. Without the flaps on the rear roller of previous style crop conveying devices the problem of carrying grain around and under the rollers, and depositing grain on the ground through the opening between the rear of the pickup and the front of the combine platform, is greatly reduced.

These and other objects and advantages of the invention will be readily understood as the following description is read in conjunction with the accompanying drawings, wherein like reference numerals have been used to designate like elements through out the several views.

BRIEF DESCRIPTION OF THE DRAWINGS

FIG. 6 is a vertical view taken along line 6—6 of FIG. 5 showing the drive means and linking components of the two rollers of the crop conveying apparatus; and FIG. 7 is a perspective view of the crop conveying apparatus.

DESCRIPTION OF THE PREFERRED EMBODIMENT

Figure 1:
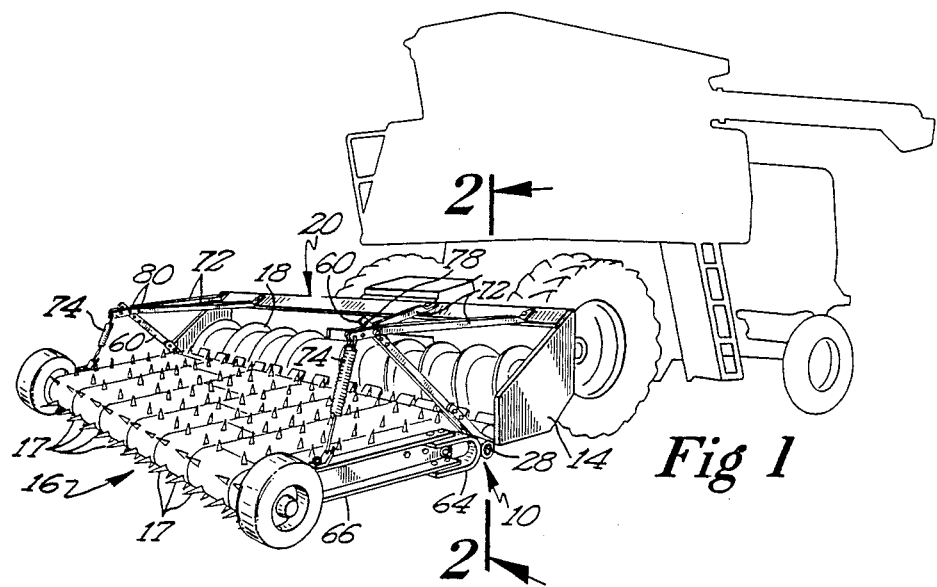
FIG. 1 is a perspective view of a tractor shown with an attached combine platform having a belt-style pickup and the improved crop conveying apparatus.

With reference to the drawings, and in particular to FIG. 7, the improved crop conveying apparatus of this invention is generally indicated by reference numeral 10. The crop conveying apparatus 10 is mounted on the combine platform 12, and is also attached to the crop pickup device 16 by means of frame linkages 64, the pickup device here illustrated as a belt-style pickup. The crop conveying apparatus 10 thus lies between the crop pickup device 16 and the combine auger 18, the auger 18 and platform 12 being part of the combine 20.

Figure 4:
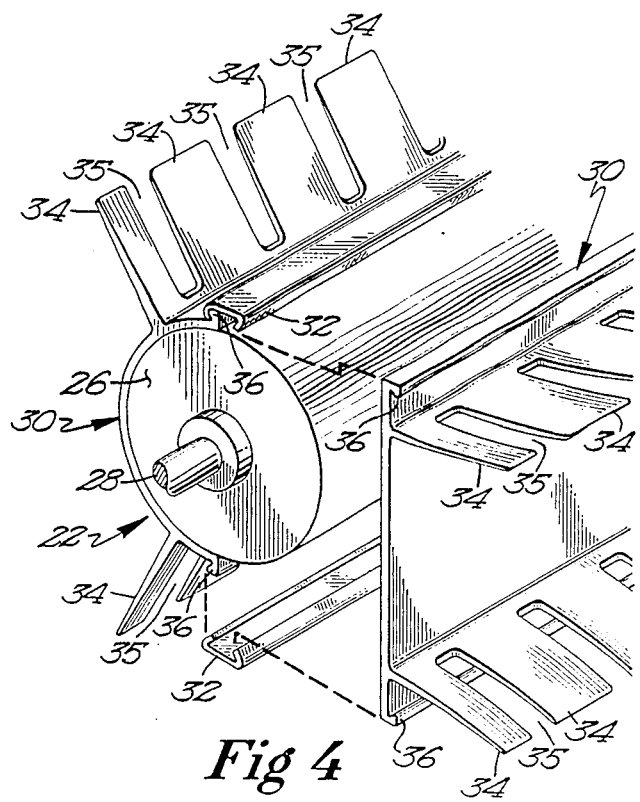
FIG. 4 is a perspective view of the finned roller shown with one of the finned portions disassembled from the roller.

The crop conveying apparatus 10 includes two rotatable, elongated rollers, a finned roller 22, also referred to as the first roller or front roller, and a second roller or rear roller 24. The two rollers are caused to rotate cooperatively by a single drive mechanism 76. As illustrated in FIG. 4, finned roller 22 has a cylindrical roller bar 26 with a first coaxial axle, or front axle 28, extending therefrom. Wrapped about the periphery and length of roller bar 26 are several finned portions or segments 30, each fastened about the roller bar 26 by a joiner 32. These joiners 32 hold the finned portions 30 to the roller bar 26, yet allow for easy removal of the finned portions 30 therefrom if the finned portions 30 should become damaged and need to be replaced. The ease with which the joiners 32 are removed permits finned portions 30 to be replaced, if necessary, while the combine 20 is in the field harvesting. At the same time, however, the joiners 32 hold the finned portions 30 together and in place firmly enough to permit high speed operation of the combine 20 without concern over whether the joiners 32 will inadvertently release the finned portions 30. The finned portions 30 are preferably of a rubber based nylon material such as "HYTREL" or "SANTOPRENE".

Figure 2:
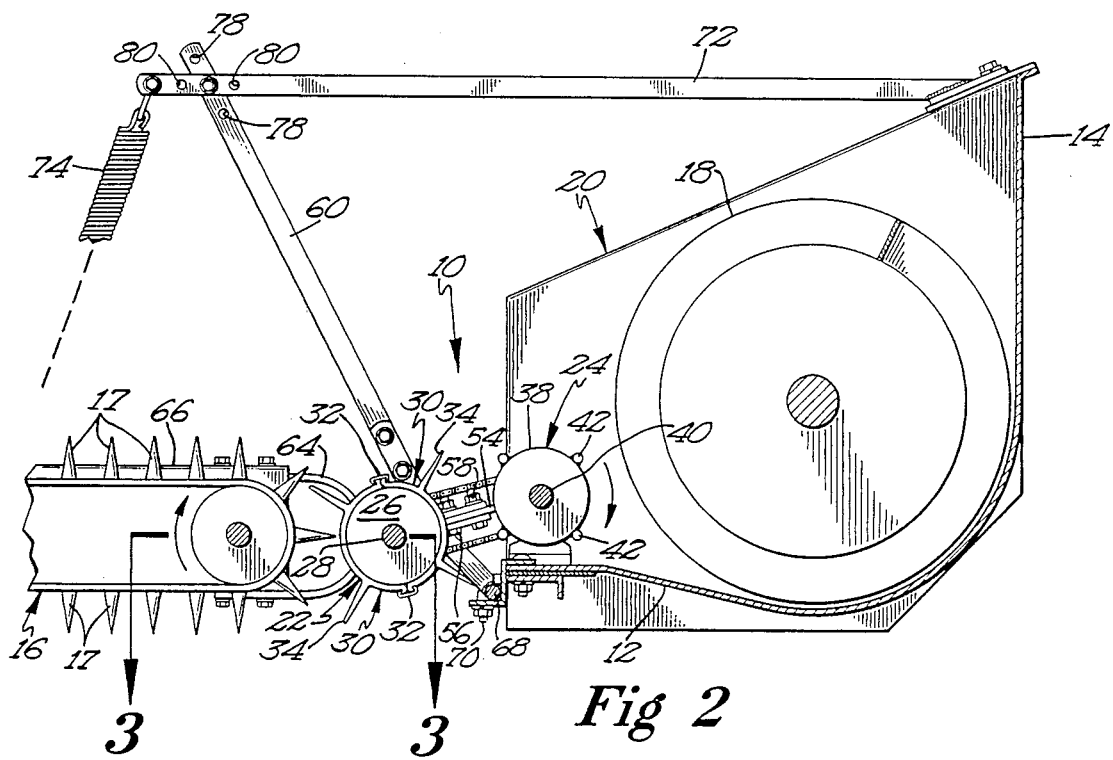
FIG. 2 is a horizontal section view of a portion of the belt pickup, the crop conveying apparatus, the combine platform and the combine auger taken along line 2—2 of FIG. 1.
Figure 3:
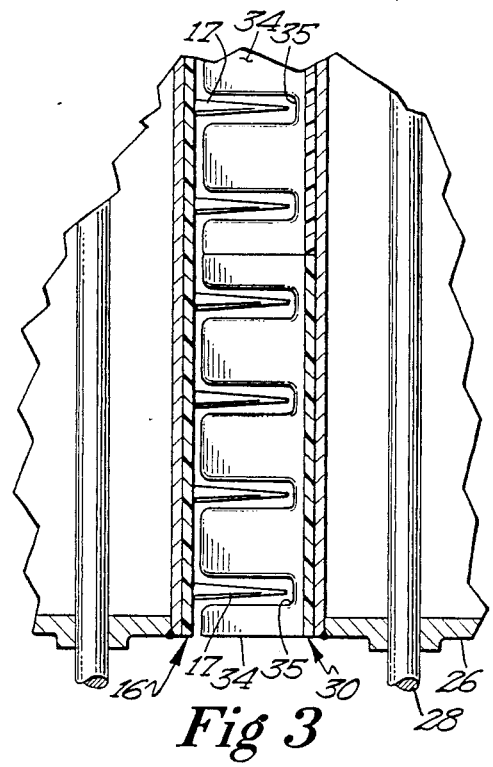
FIG. 3 is a vertical section view of the finned roller of the crop conveying apparatus and a portion of the belt-style pickup taken along line 3—3 of FIG. 2.
Figure 5:
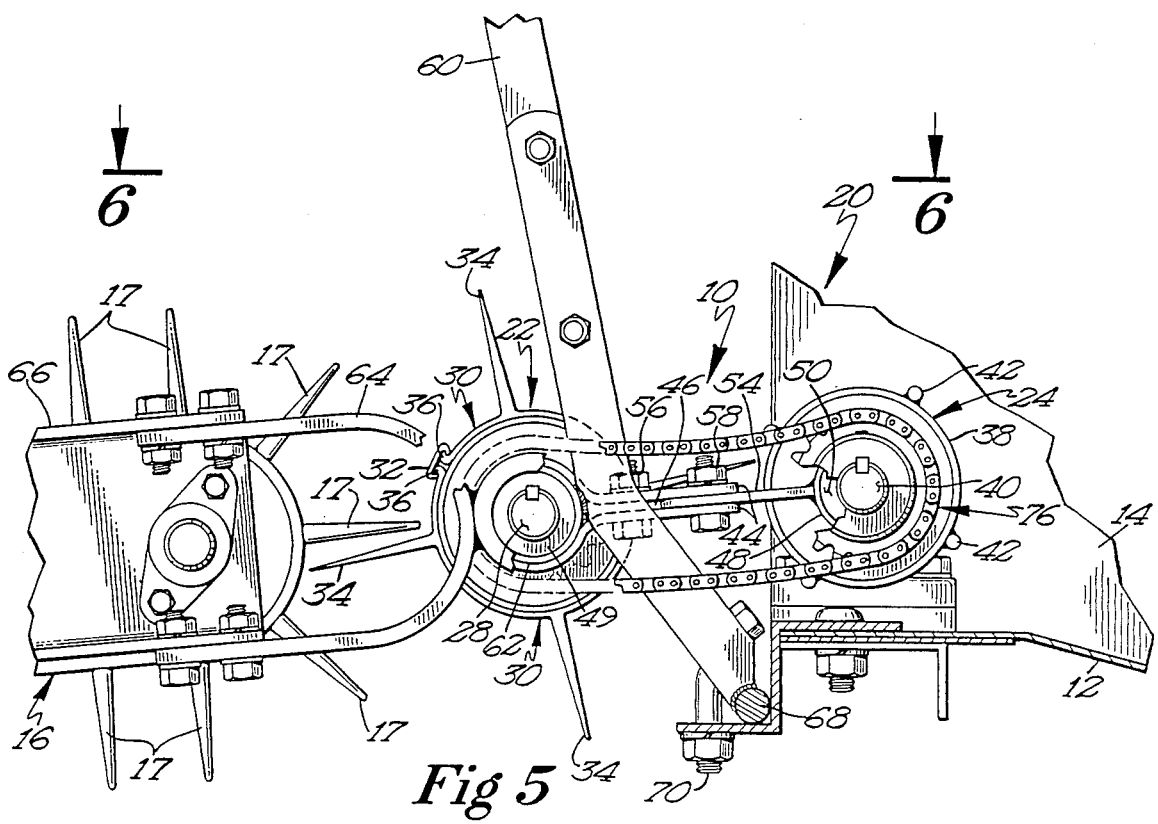
FIG. 5 is an end view similar to that shown in FIG. 2 with the end wall of the combine broken away to show the crop conveying apparatus and a drive means.

In the preferred embodiment the finned portions 30 are flat, rectangular, flexible sheets with four parallel upright rows of spaced fins or flippers 34 protruding therefrom although, as shown in FIG. 4, the finned portions 30 may have two rows of flippers 34. On the edges of these sheets parallel to the rows of fins 34 are elongate projections or bulges 36 about which the joiners 32 are placed. Flippers 34 are spaced apart along the length of finned roller 22 so as to define a plurality of slots 35 therebetween, there being four slots in the preferred embodiment. As best illustrated in FIGS. 2 and 7, the rear roller 24 includes a second cylindrical bar 38 with a second coaxial axle, or rear axle 40, extending therefrom. Permanently fastened as by spot welding to cylindrical bar 38 are four narrow, elongate strips 42 of equal size consisting usually of rods or bars. In the preferred embodiment, these strips 42 are cylindrical rods, their diameter being preferably on the order of ¼ inch, 5/16 inch, or ⅜ inch. The rear roller 24 is mounted onto and above the front portion of the combine platform 12 as shown in FIG. 2. It is further positioned close enough to the finned roller 22 so as to minimize the amount of grain which may inadvertently fall to the ground between the two rollers. Referring to FIGS. 5 and 6, finned roller 22 and rear roller 24 are joined on both ends by tighteners 44 and bearing clips 48. Tighteners 44 wrap about cylindrical roller bearing/support sleeves 62 enclosing front axle 28 in close, rotatable relation, and form a radial tongue-receiving slot 46. Tighteners 44 further include four bolt-receiving holes (not shown), two at each end, which align in opposing pairs after the tighteners 44 are positioned about the first roller bearings 49 enclosing front axle 28. Bearing clips 48 include a cylindrical sleeve with a radial tongue 54 extending therefrom. The cylindrical sleeves are of a suitable diameter for supporting second roller bearings 50, which are positioned about rear axle 40, therein. The tongues 54 of bearing clips 48 further include a radial slot 52 positioned to receive a bolt from the aligned pair of bolt-receiving holes of tighteners 44 furthest from the front axle 28 passing therethrough after positioning bearing clips 48 about second roller bearings 50 and inserting tongues 54 within the tongue-receiving slots 46 of tighteners 44. Fastening means such as bolt assemblies 56, 58 allow adjustment of rear roller 24 relative to finned roller 22. Loosening bolt assemblies 56, passing through radial slots 52, allows the rear roller 24 to be adjusted closer to or further from finned roller 22. Likewise, loosening bolt assemblies 58 allows tighteners 44 to be rotated about the front roller bearings, and thereby about front axle 28, enabling the raising or lowering of rear roller 24 relative to the finned roller 22.

The crop conveying apparatus 10 is linked to the pickup device 16 via frame linkages 64 located on both sides of the pickup device 16. These frame linkages 64 are secured to roller bearing/support sleeves 62 of the front roller 22. The frame linkages 64 are fixedly attached to the pickup device frame 66 at its rearward end. Further, upright support bars 60 are located at both ends of the crop conveying apparatus 10. The upright support bars 60 are fixedly attached as by welding to the cylindrical roller bearing/support sleeves 62 which fit in close, rotational relation about the ends of front axle 28, supporting the finned roller 22 and thereby the crop conveying apparatus 10. The upright support bars 60 are pivotally attached to the combine platform 12 allowing the crop pickup device 16 to rotate slightly about the point of pivotal attachment as slight irregularities in the surface of the ground being harvested are encountered. In the preferred embodiment, this pivotal attachment is accomplished by fixedly attaching as by welding the upright support bars 60 to pivot rods 68 which are secured to the front of the combine platform 12 by hook bolts 70. The upright support bars 60 are linked to the upper edge of the platform shroud 14 by horizontal braces 72, and help support the crop pickup device 16 by means of support springs 74 which extend from a point near the intersection of upright support bars 60 and horizontal braces 72 to a point on the forward end of the pickup device frame 66.

As the crop pickup device 16 removes windrowed grain from the surface of the field, it is conveyed rearwardly toward the combine 20. The crop conveying apparatus 10 removes the grain from the grain pickup 16 and moves it rearward toward the auger 18 of the combine. The finned roller 22 of the crop conveying apparatus 10 is rotatably supported at a predetermined position spaced rearwardly from the rear portion of the pickup 16. In the case of a belt-style pickup, the flexible fingers 17 of the pickup pass through the slots 35 of the finned roller 22 and deposit the grain on the finned roller, which is rotating in the same direction as the grain pickup. Since the flexible fingers 17 of the belt-style pickup pass through the slots 35 of the finned roller rather than beating against the finned portions 30 as was true with the old draper belt arrangement, the flexible fingers 17 of the pickup and the fins 30 of the crop conveying apparatus 10 are each subjected to less wear and therefore have a longer life than was possible with previous style crop conveying means. This is especially significant when one considers that for optimal operation the rollers 22, 24 of the crop conveying apparatus rotate at a rate of up to 150 rpm, while, as noted earlier, the belts of a belt style pickup, for example, rotate at speeds of from 30 rmp up to 70 rpm, thus placing the operational speed of the finned roller 22 in a range of from two to five times the speed of the pickup. For the same reason, more thorough and complete transfer of grain from pickup to combine is accomplished and less grain is lost in the field due to incomplete removal from the pickup.

In the case of a raking pickup, the grain is conveyed rearwardly toward the combine and is picked off of the tines of the pickup by the stripper bar or section, from which the fins of the finned roller convey the grain on toward the auger of the combine.

With the finned roller of the crop conveying apparatus rotating at a rate of approximately 150 rpm, this rotational speed causes the grain removed from the pickup to be thrown toward the auger 18 in a uniform arrangement across the top of the rear roller 24. However, the rear roller 24, which, in the preferred embodiment, rotates at the same rate as the finned roller 22 since they share a common drive mechanism 76, ensures that the grain is indeed conveyed to the auger and is not inadvertently deposited on the ground before reaching the combine platform 12. Further, as noted above, the rear roller 24 is spaced apart from the finned roller 22 so as to minimize the gap between the two rollers and thereby minimize the likelihood of backfeeding, or inadvertently dropping grains on the ground.

Adjustments are made to the position of the finned roller 22 by mating different sets of upright support bar bolt holes 78 with different horizontal brace bolt holes 80 until the desired level is reached.

It is anticipated that various changes may be made in the size, shape, construction, and arrangement of various components of the invention disclosed herein without departing from the spirit and scope of the invention as defined by the following claims.

What is claimed is:

1. An apparatus for conveying harvested crop materials to a combine having a grain receiving platform, comprising:
   pickup means for picking up various windrowed grains and other crops from the surface of a field and directing them rearwardly towards the receiving platform of the combine;
   a first elongated roller rotatably supported between said pickup means and said platform;
   a plurality of segments mounted to said first roller peripherally, each said segment extending lengthwise of said first roller and including at least one row of flexible flippers thereon projecting radially outwardly from said first roller, each row containing at least one said flipper;
   a second elongated roller rotatably supported behind said first roller in closer proximity to said platform and having a plurality of longitudinal strips fixedly attached thereto extending generally parallel to said segments; and
   drive means for said first roller and said second roller causing said first and second rollers to rotate cooperatively, whereby grain directed rearwardly by said pickup means will be caught by said flippers and conveyed onto said second roller, which further assists in conveying grain rearwardly onto said platform.

2. An apparatus for conveying harvested crop materials as defined in claim 1 wherein:
   said flexible flippers of said segments are spaced apart along the length of said first roller to define a plurality of spaced apart slots therebetween.

3. An apparatus for conveying harvested crop materials as defined in claim 1 wherein:
   said second roller is rearwardly disposed of said first roller and is positioned generally above said platform of said combine, whereby the rotation of said first and second rollers as induced by said drive means results in the removal of said grains and other crops from said pickup and the disposition thereof onto said platform.

4. An apparatus for conveying harvested crop materials defined in claim 3 wherein:
   said longitudinal strips of said second roller comprise rigid bars extending along the length of said second roller at circumferentially spaced locations around its periphery.

5. An apparatus for conveying harvested crop materials as defined in claim 1 wherein:
   said pickup means comprises a plurality of rotatably driven endless belts extending in front of said platform, each said endless belt having a multiplicity of flexible fingers projecting outwardly therefrom.

6. An apparatus for conveying harvested crop materials as defined in claim 5 wherein:
   said endless belt pickup means and said first roller are in such juxtaposition with respect to each other that said flexible fingers of said pickup means pass through said spaced apart slots between said flexible flippers as said endless belts and said first roller revolve.

7. An apparatus for conveying harvested crop materials as defined in claim 2 wherein:
   said pickup is a raking-type pickup with a multiplicity of metal tines.

8. An apparatus for conveying harvested crop material as defined in claim 2 wherein:

said first roller revolves at a speed of from two to five times the rotational speed of said pickup.

9. An apparatus for conveying harvested crop material as defined in claim 2, wherein:

said first and second rollers are closely spaced a predetermined distance from each other so as to provide a minimal spacing therebetween, whereby harvested material is directly carried from said first roller onto and over said second roller, and thence onto said platform.

10. An apparatus for conveying harvested crop materials and a revolvable belt-style or raking pickup used in combination with a combine having a grain receiving platform, said pickup having elongated fingers or tines projecting therefrom for picking up various windrowed grains and other crops from the surface of a field and conveying them rearwardly onto the combine platform, comprising:

an elongated roller rotatably supported between the pickup and the platform;

a plurality of flexible segments mounted to said roller around its periphery, each said segment extending longitudinally of said roller and including at least one row of flexible flippers thereon, said flippers being spaced apart along the length of said roller to define slots therebetween; and a drive means for said roller causing said roller to revolve in the same direction as that in which said pickup rotates, and said roller and said pickup being supported in a predetermined, spaced relationship to each other such that said pickup fingers pass through said slots as said pickup and said roller revolve.

11. An apparatus for conveying harvested crop materials as defined in claim 10 further comprising:

a second roller rearwardly disposed of said first roller and positioned generally above said platform of said combine and further including drive means to revolve said second roller in the same direction as said first roller, whereby the rotation of said first and second rollers results in the removal of said grains and other crops from said pickup and the depositing thereof onto said platform.

12. An apparatus for conveying harvested corp materials as defined in claim 11 wherein:

said second roller includes a plurality of longitudinal strips fixedly attached thereto extending generally parallel to said segments, said longitudinal strips comprising rigid bars extending along the length of said second roller at circumferentially spaced locations around its periphery.

13. An apparatus for conveying harvested crop materials as defined in claim II wherein:

said first roller revolves at a speed of from two to five times the rotational speed of said pickup.

14. An apparatus for conveying harvested crop materials as defined in claim 11 wherein:

said first and second rollers are closely spaced a predetermined distance from each other so as to provide a minimal spacing therebetween, whereby harvested material is directly carried from said first roller onto and over said second roller, and thence onto said platform.

* * * * *